United States Patent
Noël

(10) Patent No.: US 10,679,584 B1
(45) Date of Patent: Jun. 9, 2020

(54) SYSTEMS AND METHODS FOR TRANSFORMING PRESENTATION OF VISUAL CONTENT

(71) Applicant: GoPro, Inc., San Mateo, CA (US)

(72) Inventor: Jean-Baptiste Noël, Le Vesinet (FR)

(73) Assignee: GoPro, Inc., San Mateo, CA (US)

( * ) Notice: Subject to any disclaimer, the term of this patent is extended or adjusted under 35 U.S.C. 154(b) by 7 days.

(21) Appl. No.: 16/176,253

(22) Filed: Oct. 31, 2018

Related U.S. Application Data

(60) Provisional application No. 62/580,078, filed on Nov. 1, 2017.

(51) Int. Cl.
*G09G 5/06* (2006.01)
*G06T 7/90* (2017.01)

(52) U.S. Cl.
CPC .......... *G09G 5/06* (2013.01); *G06T 7/90* (2017.01); *G06T 2207/10016* (2013.01); *G06T 2207/20024* (2013.01); *G09G 2320/0242* (2013.01)

(58) Field of Classification Search
CPC .... G09G 5/06; G09G 2320/0242; G06T 7/90; G06T 5/00; G06T 2207/20172
See application file for complete search history.

(56) References Cited

U.S. PATENT DOCUMENTS

| 8,319,789 B2 * | 11/2012 | Koguchi | G06T 15/04 345/582 |
| 2015/0009227 A1 * | 1/2015 | Loeffler | H04N 1/32128 345/594 |

* cited by examiner

*Primary Examiner* — Antonio A Caschera
(74) *Attorney, Agent, or Firm* — Esplin & Associates, PC

(57) ABSTRACT

A three-dimensional lookup table may map input colors from an electronic file defining the input colors based on input pixel locations to output colors on a display medium based on output pixel locations. A filter may characterize one or more color transformations of an unfiltered image to a filtered image such that applying the filter to the unfiltered image generates the filtered image. The filter may be applied to the three-dimensional lookup table to generate a filtered three-dimensional lookup table. The filtered three-dimensional lookup table may map the input colors to filtered output colors such that a display of the unfiltered image based on the filtered three-dimensional lookup table simulates a display of the filtered image. An image may be displayed based on the filtered three-dimensional lookup table to simulate a display of the image after the filter is applied the image.

15 Claims, 6 Drawing Sheets

2D Texture Array A 502    2D Texture Array B 504

Color slices of reconstructed three-dimensional lookup table 600

SYSTEMS AND METHODS FOR TRANSFORMING PRESENTATION OF VISUAL CONTENT

FIELD

This disclosure relates to transforming presentation of visual content using a three-dimensional lookup table that has been altered using a filter.

BACKGROUND

Changing visual characteristics of visual content (e.g., images, videos) may be resource intensive. For example, applying a color transformation filter to a video may requiring transformation of individual video frames of the video.

SUMMARY

This disclosure relates to transforming presentation of visual content. A three-dimensional lookup table may be obtained. The three-dimensional lookup table may correspond to a display medium and may map input colors from an electronic file defining the input colors based on input pixel locations to output colors on the display medium based on output pixel locations. A filter may be obtained. The filter may characterize one or more color transformations of an unfiltered image to a filtered image such that applying the filter to the unfiltered image generates the filtered image. The filter may be applied to the three-dimensional lookup table to generate a filtered three-dimensional lookup table. The filtered three-dimensional lookup table may map the input colors to filtered output colors such that a display of the unfiltered image based on the filtered three-dimensional lookup table simulates a display of the filtered image. An image may be obtained. The image may be displayed based on the filtered three-dimensional lookup table. The display of the image based on the filtered three-dimensional lookup table may simulate a display of the image after the filter is applied the image.

A system that transforms presentation of visual content may include one or more processors, and/or other components. The processor(s) may be configured by machine-readable instructions. Executing the machine-readable instructions may cause the processor(s) to facilitate transforming presentation of visual content. The machine-readable instructions may include one or more computer program components. The computer program components may include one or more of a lookup table component, a filter component, an application component, an image component, a display component, and/or other computer program components. In some implementations, the computer program components may include a reconstruction component.

The lookup table component may be configured to obtain one or more three-dimensional lookup tables and/or other information. Obtaining three-dimensional lookup table(s) may include one or more of accessing, acquiring, analyzing, determining, examining, loading, locating, opening, receiving, retrieving, reviewing, storing, and/or otherwise obtaining the three-dimensional lookup table(s). The lookup table component may obtain three-dimensional lookup table(s) from one or more locations.

A three-dimensional lookup table may correspond to a display medium and/or other mediums. A three-dimensional lookup table may map input colors from an electronic file defining the input colors based on input pixel locations to output colors on the display medium based on output pixel locations. In some implementations, a three-dimensional lookup table may be stored in a three-dimensional texture. In some implementations, a three-dimensional lookup table may be stored in a two-dimensional texture, such as a two-dimensional array. A two-dimensional texture may include color slices of the three-dimensional lookup table in an array.

The filter component may be configured to obtain one or more filters and/or other information. Obtaining filter(s) may include one or more of accessing, acquiring, analyzing, determining, examining, loading, locating, opening, receiving, retrieving, reviewing, storing, and/or otherwise obtaining the filter(s). The filter component may obtain filter(s) from one or more locations. A filter may characterize one or more color transformations of an unfiltered image to a filtered image such that applying the filter to the unfiltered image generates the filtered image.

The application component may be configured to apply the filter(s) to a three-dimensional lookup table to generate a filtered three-dimensional lookup table. The filtered three-dimensional lookup table may map the input colors to filtered output colors such that a display of an unfiltered image based on the filtered three-dimensional lookup table simulates a display of a filtered image. In some implementations, a size of the filtered three-dimensional lookup table may be reduced based on one or more changes in a resolution and/or a number of color slices of the filtered three-dimensional lookup table.

The reconstruction component may be configured to generate one or more reconstructed three-dimensional lookup tables based on comparison(s) of original image(s) and modified image(s). A modified image may be generated based on one or more color transformations of an original image. In some implementations, generating a reconstructed three-dimensional lookup table may include obtaining an original image and a modified image. A first set of colors of the original image may be sampled at sample points within the original image. A second set of colors of the modified image may be sampled at the sample points within the modified image. The reconstructed three-dimensional lookup table may be determined based on comparisons of the first set of colors with the second set of colors, and/or other information. In some implementations, the reconstructed three-dimensional lookup table may be determined further based on a tetrahedron interpolation. In some implementations, a size of the reconstructed three-dimensional lookup table may be reduced based on one or more changes in a resolution and/or a number of color slices of the reconstructed three-dimensional lookup table.

In some implementations, comparison of different sets of colors from the original image and the modified image may result in missing values within the reconstructed three-dimensional lookup table. Missing portions of a reconstructed three-dimensional lookup table may be determined based on extrapolation and/or interpolation (e.g., linear, quadratic, tetrahedron) values calculated within the reconstructed three-dimensional lookup table. For example, linear/quadratic/tetrahedron approximation may be used to determine eight vertices and/or other points/values of the reconstructed three-dimensional lookup table cube.

The image component may be configured to obtain one or more images and/or other information. In some implementations, the image(s) may include one or more video frames of a video. Obtaining image(s) may include one or more of accessing, acquiring, determining, examining, loading, locating, opening, receiving, retrieving, reviewing, storing, and/or otherwise obtaining the image(s). The image component may obtain image(s) from one or more locations.

The display component may be configured to display the image(s) based on the filtered three-dimensional lookup table and/or other information. The display of the image(s) based on the filtered three-dimensional lookup table may simulate a display of the image(s) after the filter(s) have been applied to the image(s). In some implementations, The display component may be configured to display the image(s) based on the reconstructed three-dimensional lookup table and/or other information.

In some implementations, the filtered three-dimensional look up table and/or the reconstructed three-dimensional look up table may compensate for one or more color differences between images captured by different image capture devices. In some implementations, the filtered three-dimensional look up table and/or the reconstructed three-dimensional look up table may compensate for one or more color differences between images captured in different lighting conditions.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
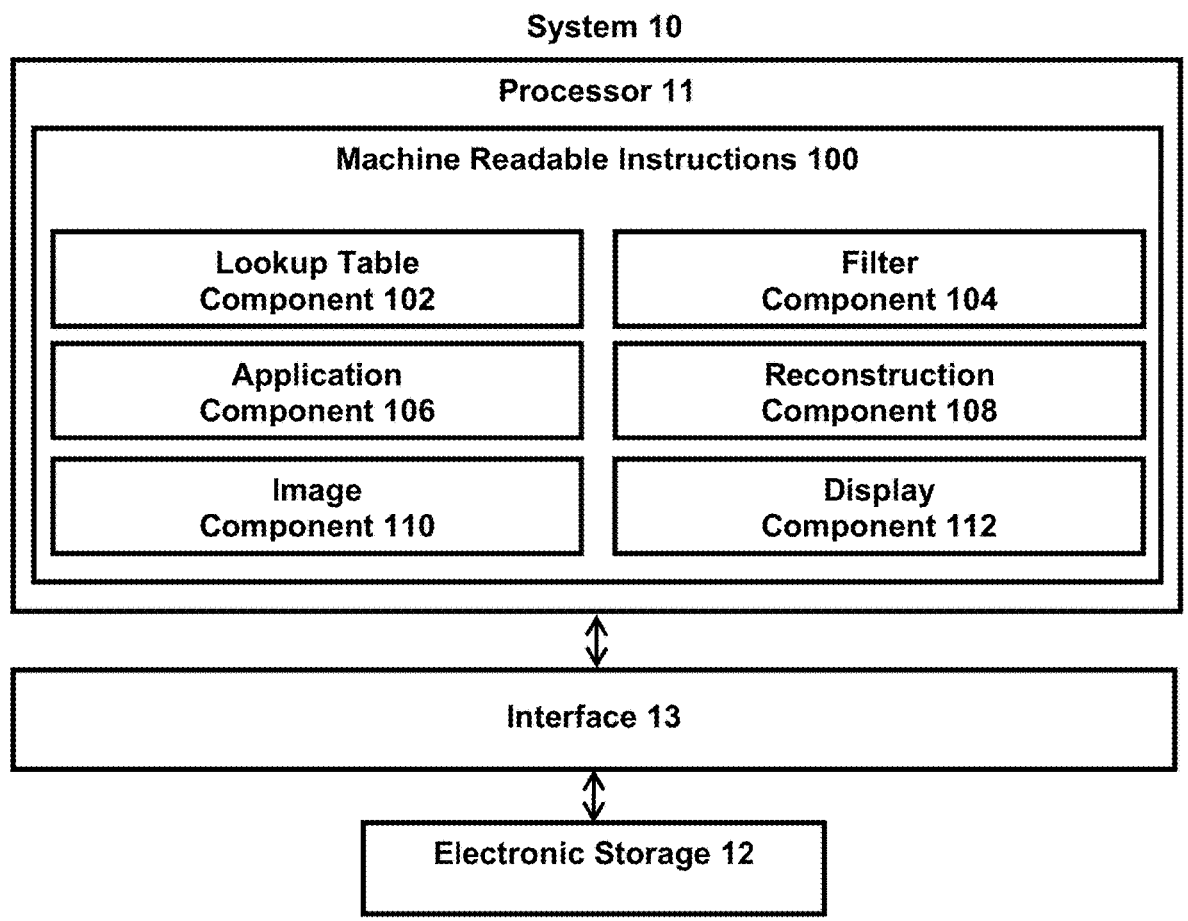
FIG. 1 illustrates an example system that transforms presentation of visual content.

FIG. 1 illustrates a system 10 for transforming presentation of visual content. The system 10 may include one or more of a processor 11, an electronic storage 12, an interface 13 (e.g., bus, wireless interface), a display 14, and/or other components. A three-dimensional lookup table may be obtained by the processor 11. The three-dimensional lookup table may correspond to a display medium and may map input colors from an electronic file defining the input colors based on input pixel locations to output colors on the display medium based on output pixel locations. A filter may be obtained by the processor 11. The filter may characterize one or more color transformations of an unfiltered image to a filtered image such that applying the filter to the unfiltered image generates the filtered image. The filter may be applied to the three-dimensional lookup table to generate a filtered three-dimensional lookup table. The filtered three-dimensional lookup table may map the input colors to filtered output colors such that a display of the unfiltered image based on the filtered three-dimensional lookup table simulates a display of the filtered image. An image may be obtained by the processor 11. The image may be displayed based on the filtered three-dimensional lookup table. The display of the image based on the filtered three-dimensional lookup table may simulate a display of the image after the filter is applied the image.

The electronic storage 12 may be configured to include electronic storage medium that electronically stores information. The electronic storage 12 may store software algorithms, information determined by the processor 11, information received remotely, and/or other information that enables the system 10 to function properly. For example, the electronic storage 12 may store information relating to three-dimensional lookup table, display medium, filter, color transformation, images, and/or other information.

Visual content may refer to media content that may be consumed as one or more image, one or more videos, and/or other visual presentations. Visual content may include one or more images/videos stored in one or more formats/containers, and/or other visual content. A format may refer to one or more ways in which the information defining visual content is arranged/laid out (e.g., file format). A container may refer to one or more ways in which information defining visual content is arranged/laid out in association with other information (e.g., wrapper format).

Visual content may include an image/video clip captured by an image/video capture device, multiple images/video clips captured by an image/video capture device, and/or multiple images/video clips captured by separate image/video capture devices. Visual content may include multiple images/video clips captured at the same time and/or multiple images/video clips captured at different times. Visual content may include an image/video clip processed by an image/video application, multiple images/video clips processed by an image/video application and/or multiple images/video clips processed by separate image/video applications.

Video content may include visual content viewable as a function of progress through the video content. Video content may include audio content playable as a function of progress through the video content. Video content may have a progress length. A progress length may be defined in terms of time durations and/or frame numbers. For example, video content may include a video having a time duration of 60 seconds. Video content may include a video having 1800 video frames. Video content having 1800 video frames may have a play time duration of 60 seconds when viewed at 30 frames/second. Other time durations and frame numbers are contemplated.

Referring to FIG. 1, the processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine readable instructions 100 to facilitate transforming presentation of visual content. The machine readable instructions 100 may include one or more computer program components. The machine readable instructions 100 may include one or more of a lookup table component 102, a filter component 104, an application component 106, an image component 110, a display component 112, and/or other computer program components. In some implementations, the machine readable instructions 100 may include a reconstruction component 108.

The lookup table component 102 may be configured to obtain one or more three-dimensional lookup tables and/or other information. Obtaining three-dimensional lookup table(s) may include one or more of accessing, acquiring, analyzing, determining, examining, loading, locating, opening, receiving, retrieving, reviewing, storing, and/or otherwise obtaining the three-dimensional lookup table(s). The lookup table component 102 may obtain three-dimensional lookup table(s) from one or more storage locations. A storage location may include electronic storage 12, electronic storage of one or more image sensors (not shown in FIG. 1), electronic storage of a device accessible via a network, and/or other locations. For example, the lookup table component 102 may obtain three-dimensional lookup tables stored in the electronic storage 12.

A three-dimensional lookup table may correspond to a display medium and/or other mediums. For example, a three-dimensional lookup table may correspond to a particular display medium (e.g., a display of a particular mobile device) or a particular type of a display medium (e.g., an LCD display, an LED display, an OLED display). A three-dimensional lookup table may provide correspondence/association between particular input colors and particular output colors. A three-dimensional lookup table may map input colors from an electronic file defining input colors based on input pixel locations to output colors on the display medium based on output pixel locations. For example, an electronic file for an image may define colors (input colors) of the image based on pixel locations within the image. A three-dimensional lookup table may be used to transform input colors into output colors. A three-dimensional lookup table may provide by color transformation of the image by mapping the input colors of pixels of the image to output colors of pixels of the image output on a particular display. For example, a three-dimensional lookup table may provide automatic conversions of what RGB values to output based on input RGB values.

A three-dimensional lookup table may enable outputs of higher quality color images than linear color production because the three-dimensional lookup table may provide for calculation of output colors using a volumetric color space. For example, conversion from one color space into another color space may be performed more accurately using a three-dimensional lookup table than linear color conversion, with the three-dimensional lookup table providing better intermediate color graduation using non-linear behavior of the three-dimensional lookup table.

Figure 3:
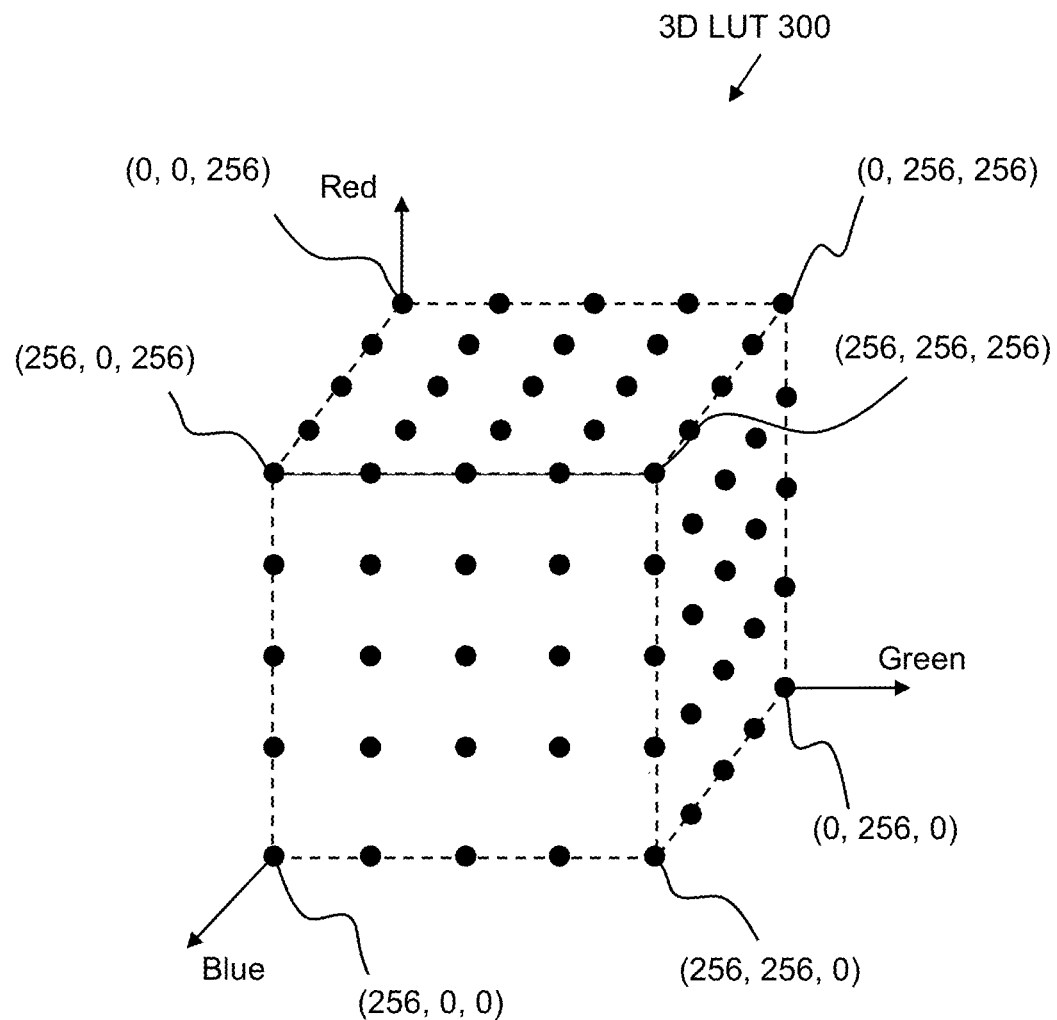
FIG. 3 illustrates an example three-dimensional lookup table.

An example 3D LUT 300 is shown in FIG. 3. The 3D LUT 300 may provide conversion of RGB input colors to RGB output colors. That is, individuals points in the 3D LUT 300 may correspond to particular input colors and particular output colors defined within the RGB color space. Use of the 3D LUT 300 may enable color transformation of an image having input colors to presentation on a display using output colors.

In some implementations, a three-dimensional lookup table may be stored in a three-dimensional texture, a two-dimensional texture, and/or other textures. A two-dimensional texture may include color slices of the three-dimensional lookup table in an array, such as a two-dimensional array. That is, the three-dimensional lookup table may be separated into two-dimensional slices, which are arranged within an array. Such storage of a three-dimensional lookup table may enable storage and/or use of the three-dimensional lookup table by systems (hardware and/or software) that does not support three-dimensional color tables. For example, the two-dimensional texture including the values of the three-dimensional lookup table may be stored as an image file (e.g., JPG, PNG, BMP).

Figure 4:
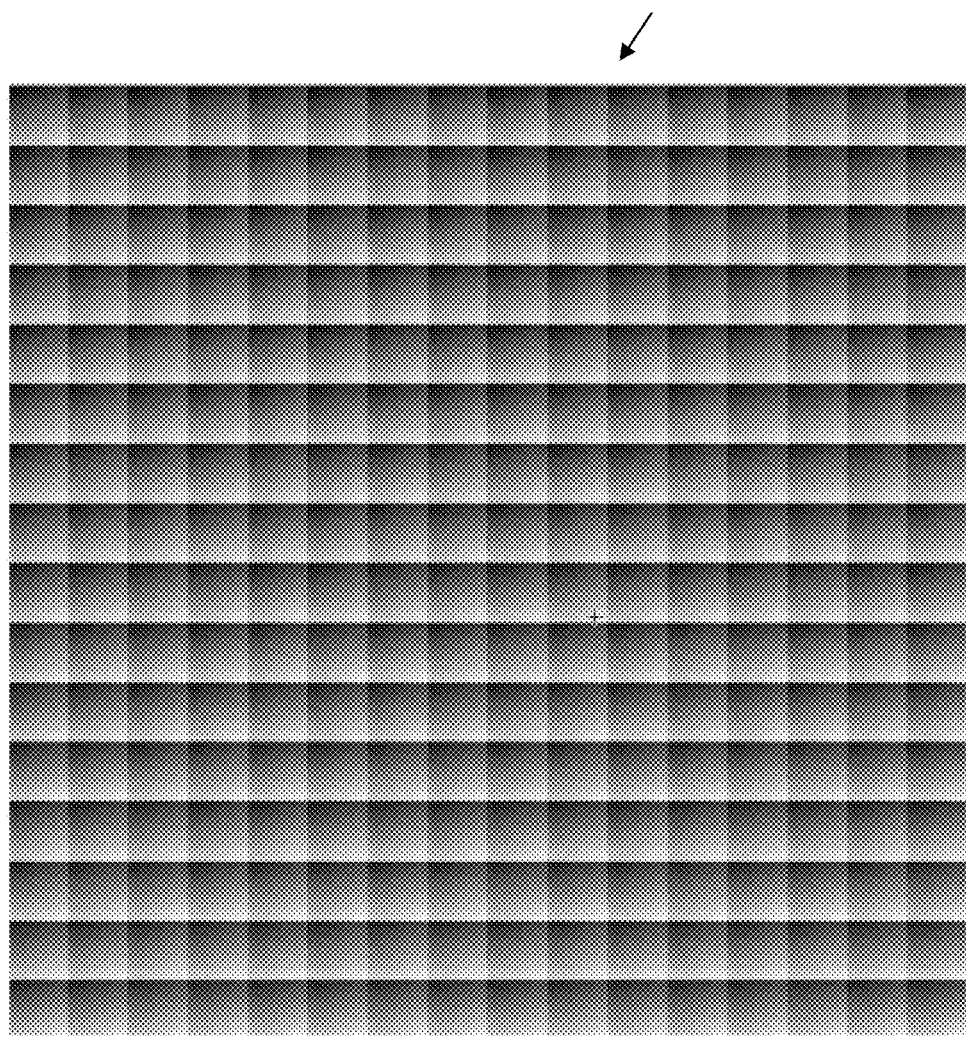
FIG. 4 illustrates an example two-dimensional texture array including color slices of a three-dimensional lookup table.

For example, FIG. 4 illustrates an example 2D texture array 400 including color slices of a three-dimensional lookup table. The 2D texture array 400 may represent a projection of the three-dimensional lookup table in a two-dimensional space. Individual squares of the 2D texture array 400 may be a slice of the three-dimensional lookup table cube. Individual squares may provide correspondence/association between particular input colors and particular output colors as defined by two color axes (e.g., red and green), and may correspond to a particular value on the third color axis (e.g., blue). For example, the upper left square within the 2D texture array 400 may provide color transformations for varying red and green input values with a blue input value of 0. The lower right square within the 2D texture array 400 may provide color transformations for varying red and green input values with a blue input value of 256. With 256 squares having resolution of 256×256, the 2D texture array 400 may provide color transformations for 16,777,216 different colors. Two-dimensional textures storing information for other numbers and/or types of color transformation are contemplated.

The filter component 104 may be configured to obtain one or more filters and/or other information. Obtaining filter(s) may include one or more of accessing, acquiring, analyzing, determining, examining, loading, locating, opening, receiving, retrieving, reviewing, storing, and/or otherwise obtaining the filter(s). The filter component 104 may obtain filter(s) from one or more storage locations. A storage location may include electronic storage 12, electronic storage of one or more image sensors (not shown in FIG. 1), electronic storage of a device accessible via a network, and/or other locations. For example, the filter component 104 may obtain filters stored in the electronic storage 12. In some implementations, the filter component 104 may obtain one or more particular filters based on user selection and/or other information. For example, a user may select a particular filter using a user interface (e.g., user interface of an image/video viewing/editing software), and the filter component 104 may obtain the particular filter based on the user's selection.

A filter may characterize one or more color transformations of an unfiltered image to a filtered image such that applying the filter to the unfiltered image generates the filtered image. That is, applying a filter to an unfiltered image may generate a filtered image by transforming input colors of the unfiltered image to output colors of the filtered image based on the input colors. In some implementations, applying a filter may simulate the use of a particular color filter/lens to capture an image/video. The filter may be applied to the image/video after the image/video has been captured and may simulate the use of a particular color filter/lens after image/video capture. In some implementations, applying a filter may effectuate color transformation that includes color changes (e.g., changing one or more input colors to one or more output colors based on adjustment of RGB values) and/or color replacements (e.g., changing one or more input colors to one or more output colors based on replacing particular input colors to particular output colors).

The application component 106 may be configured to apply the filter(s) to a three-dimensional lookup table to generate a filtered three-dimensional lookup table. Applying the filter(s) to a three-dimensional lookup table may include applying the filter directly to the three-dimensional lookup table and/or applying the filter to a representation of the three-dimensional lookup table (e.g., a two-dimensional texture including color slices of the three-dimensional lookup table). The filtered three-dimensional lookup table (e.g., filtered two-dimensional texture including color slices of the filtered three-dimensional lookup table) may map the input colors to filtered output colors such that a display of an unfiltered image based on the filtered three-dimensional lookup table simulates a display of a filtered image.

Rather than applying a filter to an unfiltered image to generate a filtered image, the application component 106 may apply the filter to a three-dimensional lookup table to generate a filtered three-dimensional lookup table. Application of the filter to a three-dimensional lookup table may effectuate color transformation of the three-dimensional lookup table based on the filter, the colors of the three-dimensional lookup table, and/or other information. The transformation of the colors may be stored in the filtered three-dimensional lookup table. The use of the filtered three-dimensional lookup table to display an image may result in the presentation of the image on the display that simulates a display of a filtered image using an unfiltered three-dimensional lookup table.

That is, rather than applying a filter to an image to generate a filtered image, a "filtered" version of the image may be displayed by using the filtered three-dimensional lookup table to display the image. Such use of a filtered three-dimensional lookup table may provide for reduced resource consumption (e.g., processing, power, memory) when displaying one or more images. For example, rather than applying a filter multiple times to images to generate/display filtered versions of multiple images, the filter may be applied once to a three-dimensional lookup table to generate a filtered three-dimensional lookup table and the filtered three-dimensional lookup table may be used to display multiple images. As another example, multiple filters may be applied to a three-dimensional lookup table to create the desired color transformation. Rather than applying multiple filters to images to produce the desired color transformation, the filtered three-dimensional lookup table (generated via application of multiple filters) may be used to simulate application of multiple filters on images.

In some implementations, a size of a filtered three-dimensional lookup table may be reduced based on one or more changes in a resolution and/or a number of color slices of the filtered three-dimensional lookup table. For example, storage of a filtered three-dimensional lookup table containing true color (e.g., 16,777,216) may require consumption of large storage space (e.g., 64 MB in RGBA mode (3 bytes per color and 1 byte for alpha channel); 48 MB in RGB mode (3 byes per color)). Storage of such three-dimensional lookup table may consume large amount of storage space for mobile devices (e.g., camera, smartphone, tablet, laptop, smartwatch) and may limit the use of filtered three-dimensional lookup tables. The size of the red three-dimensional lookup table may be reduced by reducing the number of color squares and/or the number of colors represented within individual color squares.

Figure 5:
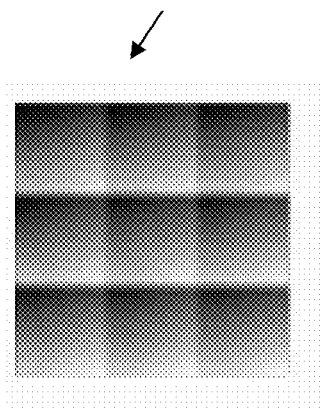
FIG. 5 illustrates example two-dimensional texture arrays.
Figure 5:
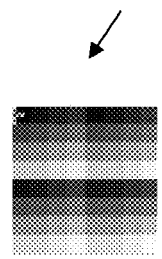

For example, rather than soaring a filtered three-dimensional lookup table using the structure shown in FIG. 4, the filtered three-dimensional lookup table may be stored using structures such as shown in FIG. 5. In FIG. 5, the 2D texture arrays 502, 504 may have been generated from a larger 2D texture array (e.g., the 2D texture array 400) by reducing the resolution of the color squares (e.g., from 256×256 per square in the 2D texture array 400 to 9×9 per square in the 2D texture array A 502; from 256×256 per square in the 2D texture array 400 to 4×4 per square in the 2D texture array B 504) and/or by reducing the number of color slices of the filtered three-dimensional lookup table stored within the 2D texture array 502, 504 (e.g., from 256 squares in the 2D texture array 400 to 9 squares in the 2D texture array A 502; from 256 squares in the 2D texture array 400 to 4 squares in the 2D texture array B 504). Such changes may effectuate compression of the filtered three-dimensional lookup table. Other changes in resolution and/or number of color slices of the filtered three-dimensional lookup table are contemplated.

Compression of the filtered three-dimensional lookup table may provide a tradeoff between quality (e.g., proximity to original 256×256×256 3D LUT) and memory footprint. For example, a 256×256×256 3D LUT may require consumption 48 MB of storage (in RGB mode) while a 36×36×36 3D LUT may require consumption of 137 kB of storage (in RGB mode).

In some implementations, storage of the filtered three-dimensional lookup table within a two-dimensional texture may be limited to a set of sizes. The set of sizes may be given by: 3D LUT size=$i^2 \times i^2 \times i^2$, 2D texture size=$i^3 \times i^3$, for i in [2, 16]. For example, a 3D LUT of 4×4×4 (i=2) may be stored in a two-dimensional texture of 8×8, a 3D LUT of 9×9×9 (i=3) may be stored in a two-dimensional texture of 27×27, a 3D LUT of 36×36×36 (i=6) may be stored in a two-dimensional texture of 216×216, and a 3D LUT of 256×256×256 (i=16) may be stored in a two-dimensional texture of 4096×4096 (full RGB 8 bits LUT).

A "compressed" filtered three-dimensional lookup table may be used to simulate displaying of filtered images. In some implementations, one or more interpolation techniques may be used to simulate displaying of filtered image using the "compressed" filtered three-dimensional lookup table. That is, the compression of the filtered three-dimensional lookup table may have removed values from the filtered three-dimensional lookup table and one or more interpolations (e.g., linear, quadratic, tetrahedron) may be used to calculate the "removed" values based on values remaining in the "compressed" filtered three-dimensional lookup table.

In some implementations, interpolations between/within squares of (compressed) filtered three-dimensional lookup table may include one or more interpolations performed by one or more graphics processing units (GPU). For example, for a filtered three-dimensional lookup table may include separate squares of differing blue values. Interpolation of the filtered three-dimensional lookup table may include selection of a particular square having a particular blue value or interpolation between squares having particular blue values. Such interpolation may be performed a particular interpolation (e.g., trilinear interpolation). For interpolation within the selected/interpolated square, interpolation of the GPU (e.g., bilinear interpolation) may be used. Conversion of input colors to output colors may be performed based on three texture picking: a value of the original texture and two values of two selected textures (e.g., bilinear interpolation by GPU). Third interpolation (e.g., linear interpolation) may be performed within a shade to provide quick results. The third interpolation may be simple and may not require calculation by the GPU.

The reconstruction component 108 may be configured to generate one or more reconstructed three-dimensional lookup tables based on comparison(s) of original image(s) and modified image(s). A modified image may be generated based on one or more color transformations of an original image. That is, a modified image may be generated based on application of one or more filters that apply color transformations on the original image. Generating a reconstructed three-dimensional lookup table may include obtaining an original image, a modified image, and/or other information. Sets of colors may be sampled from the original image and the modified image at the same pixel locations. That is, a first set of colors of the original image may be sampled at particular sample points within the original image. A second set of colors of the modified image may be sampled at the particular sample points within the modified image. The reconstructed three-dimensional lookup table may be determined based on comparisons of the first set of colors with the second set of colors, and/or other information. The reconstructed three-dimensional lookup table may be used to simulation the application of filter(s) used on the original image to generate the modified image.

In some implementations, comparison of different sets of colors from the original image and the modified image may include one or more color extraction techniques. For example, the values of the reconstructed three-dimensional lookup table along the blue, red, and green axes may be determined using different color extraction techniques to determines their values. For example, a linear approach (e.g., one equation for RGB and one constant for each channel) may be used to determine linear combinations of RGB values to create the output. A quadratic approach may include separate equations for R values, G values, B values, RG values, BR values, GB values, and/or other values. A tetrahedron approach may include building a list of points within a three-dimensional space. Based on location of a point corresponding to an input, relative weight of different segments of tetrahedron of each vertex may be used to calculate color inside the tetrahedron. The tetrahedron approach may include tetrahedron interpolation for different regions of space.

Figure 6:
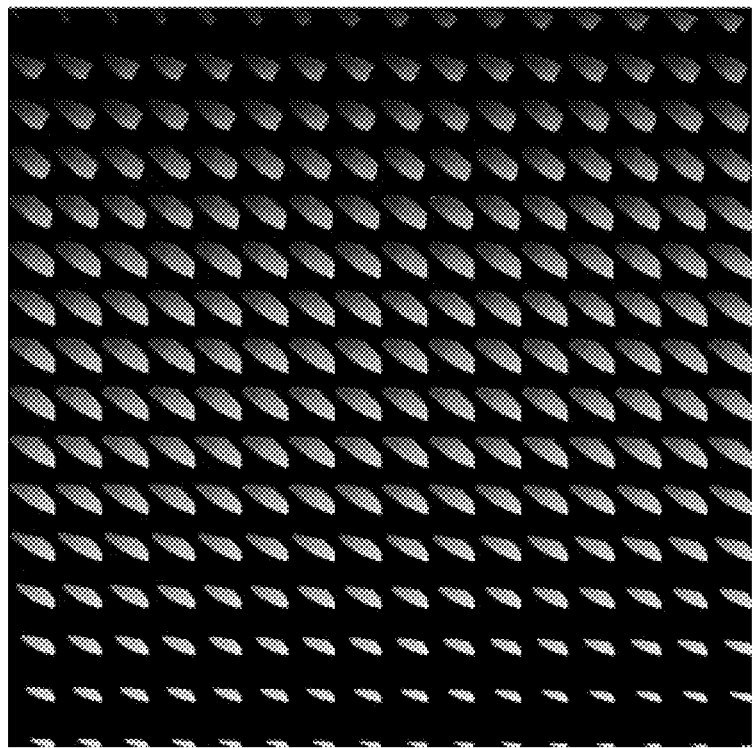
FIG. 6 illustrates an example color slices of reconstructed three-dimensional lookup table.

In some implementations, comparison of different sets of colors from the original image and the modified image may result in missing values within the reconstructed three-dimensional lookup table. That is, compared sets of colors may not represent the entirety of desired color spectrum (e.g., the images do not explore full RGB space) and color extraction may not include values for all color points within the reconstructed three-dimensional lookup table. For example, FIG. 6 illustrates example color slices of reconstructed three-dimensional lookup table 600 (such as stored within two-dimensional texture array) calculated based on comparison of different sets of colors from an original image and a modified image. The black portions of the color slices may represent values outside the convex space (missing values in the reconstructed three-dimensional lookup table). Missing portions of a reconstructed three-dimensional lookup table may be determined based on extrapolation and/or interpolation (e.g., linear, quadratic, tetrahedron) values calculated within the reconstructed three-dimensional lookup table. For example, linear/quadratic/tetrahedron approximation may be used to determine eight vertices and/or other points/values of the reconstructed three-dimensional lookup table cube.

For instance, linear approximation may include linear extrapolation from and to 3D RGB space. Quadratic approximation may include quadratic extrapolation from and to 3D RGB space. Polynomial approximation may include polynomial extrapolation from and to 3D RGB space (includes linear and quadratic extrapolation). Extra tetrahedrons may be created with color identity at the vertex of the cube. Extrapolation of the tetrahedron may include the use of the closest tetrahedron to the point and extrapolation of the value outside of it.

For example, tetrahedron interpolation may include division of a cube into six tetrahedrons. Interpolation inside a tetrahedron may be computed based on the weighted averages of the values at the vertices. For example, vertices A, B, C, D in relative coordinates may be given by A (0, 0, 0), B (1, 0, 0), C (0, 1, 0), and D (0, 0, 1). For a given point P (xr, yr, zr) inside the tetrahedron with 0≤xr≤1; 0≤yr≤1; 0≤zr≤1, weights may be determined based on relative volumes of sub-tetrahedrons defined using vertex P: weight for A volume PBCD; weight for B volume APCD; weight for C volume ABPD, weight for D volume ABCP. For the given point P inside the tetrahedron, weights may be determined as follows: weight for A is (1−xr)*(1−yr)*(1−zr); weight for B is xr*(1−yr)*(1−zr); weight for C is (1−xr)*yr*(1−zr); weight for D is (1−xr)*(1−yr)*zr.

Tetrahedron interpolation may use a Delaunay tessellation on the input points (in RGB space) to create tetrahedrons. For a given input value, the containing tetrahedron may be identified and the weights (for the given input value) corresponding to each input points may be calculated. The output value may be interpolated from the weights and the output points associated to the input points. Delaunay tessellation may create the convex volume containing all the input points.

In some implementations, a size of a reconstructed three-dimensional lookup table may be reduced based on one or more changes in a resolution and/or a number of color slices of the reconstructed three-dimensional lookup table. For example, as described above with respect to storage of filtered three-dimensional lookup tables (See FIG. 5), the size of the reconstructed three-dimensional lookup table may be reduced based on reduction of resolution of the color squares and/or reduction of the number of color slices of the reconstructed three-dimensional lookup table.

The image component 110 may be configured to obtain one or more images and/or other information. In some implementations, the image(s) may include one or more video frames of a video. Obtaining image(s) may include one or more of accessing, acquiring, analyzing, determining, examining, loading, locating, opening, receiving, retrieving, reviewing, storing, and/or otherwise obtaining the image(s). The image component 110 may obtain image(s) from one or more storage locations. A storage location may include electronic storage 12, electronic storage of one or more image sensors (not shown in FIG. 1), electronic storage of a device accessible via a network, and/or other locations. For example, the image component 110 may obtain images stored in the electronic storage 12. The image component 110 may be configured to obtain images during acquisition of the images and/or after the acquisition of the images by one or more image sensors. For example, the image component 110 may obtain an image while the image is being captured by one or more image sensors. The image component 110 may obtain an image after the image has been captured and stored in memory (e.g., the electronic storage 12). In some implementations, the image component 110 may obtain one or more particular images based on user selection and/or other information. For example, a user may select a particular image using a user interface (e.g., user interface of an image/video viewing/editing software), and the image component 110 may obtain the particular image based on the user's selection.

The display component 112 may be configured to display the image(s) on one or more displays. The image(s) may be displayed by the display component 112 based on the filtered three-dimensional lookup table and/or other information. The display of the image(s) based on the filtered three-dimensional lookup table may simulate a display of the image(s) after the filter(s) have been applied to the image(s). In some implementations, the display component 112 may be configured to display the image(s) based on the reconstructed three-dimensional lookup table and/or other information. Displaying of the image(s) based on the filtered/reconstructed three-dimensional lookup table may include conversion of color values in the image(s) for the output of the images. The display component 112 may, rather than applying one or more filters to the image(s) to display filtered image(s), use the filtered/reconstructed three-dimensional lookup table to simulate the application of the filter(s) to the image(s). Such use of filtered/reconstructed three-dimensional lookup table to simulate application of filters may provide for reduced resource consumption (e.g., processing, power, memory) when displaying the image(s). In some implementations, the color processing may be performed by one or more shaders. Shader(s) may perform one or more interpolations to determine the appropriate color conversion to use for output.

In some implementations, a filtered three-dimensional look up table and/or a reconstructed three-dimensional look up table may compensate for one or more color differences between images captured by different image capture devices. Images (e.g., single/burst images, video frames of videos) captured by two different image capture devices may have different colors. For example, images captured by one image capture devices may have different color tones/saturation than images captured by another image capture device. Such color difference may make combined viewing of images captured by different image capture devices jarring (e.g., transitioning between images/videos having different color tones). One or more filtered three-dimensional look up tables and/or one or more reconstructed three-dimensional look up table may compensate for the color differences between images captured by different image capture devices.

For example, a filtered/reconstructed three-dimensional look up table may convert the color tones of an image captured by a first image capture device to the color tones of an image captured by a second image capture device. As another example, a first filtered/reconstructed three-dimensional look up table may convert the color tones of an image captured by a first image capture device and a second filtered/reconstructed three-dimensional look up table may convert the color tones of an image captured by a second image capture device to common color tones. Such use of filtered/reconstructed three-dimensional look up table(s) may effectuate color corrections on the fly.

In some implementations, a filtered three-dimensional look up table and/or a reconstructed three-dimensional look up table may compensate for one or more color differences between images captured in different lighting conditions. Different lighting conditions may be the result of different scenes and/or context. For example, images captured indoors may have different colors than images captured outdoors. Images captured at a particular activity/scene (e.g., beach activity, at the beach vs) may have different colors than images captured at other activities (skiing activity, at snowy mountain). One or more filtered three-dimensional look up tables and/or one or more reconstructed three-dimensional look up table may compensate for the color differences between images captured in different light conditions to provide color corrections on the fly. In some implementations, a filtered three-dimensional look up table and/or a reconstructed three-dimensional look up table may be used to simulate application of one or more filters based on content of the images (e.g., scene/facial/activity detection/identification).

Visual content may include spherical visual content (e.g., spherical image content, spherical video content), virtual reality content, and/or other visual content. Spherical image content/virtual reality content may define visual content viewable from a point of view (e.g., center of sphere/spherical space). Spherical video content/virtual reality content may define visual content viewable from a point of view as a function of progress (defined in terms of (play) duration and/or frame numbers) through the content.

Spherical visual content may refer to an image/video capture of multiple views from one or more locations. Spherical image/video content may include a full spherical image/video capture (360 degrees of capture, including opposite poles) or a partial spherical image/video capture (less than 360 degrees of capture). Spherical visual content may be captured through the use of one or more cameras/image sensors to capture images/videos from a location. For example, multiple images/videos captured by multiple image sensors may be stitched together to form the spherical visual content. The field of view of image sensor(s) may be moved/rotated (e.g., via movement/rotation of optical element(s), such as lens, of the image sensor(s)) to capture multiple images/videos from a location, which may be stitched together to form the spherical visual content. Spherical visual content may include capture of computer-generated objects, such as two-dimensional or three-dimensional computer-generated objects, visual overlays, and/or other computer-generated objects. In some implementations, spherical visual content may be consumed as virtual reality content.

Virtual reality content may refer to content that may be consumed via virtual reality experience. Virtual reality content may associate different directions within the virtual reality content with different viewing directions, and a user may view a particular directions within the virtual reality content by looking in a particular direction. For example, a user may use a virtual reality headset to change the user's direction of view. The user's direction of view may correspond to a particular direction of view within the virtual reality content. For example, a forward looking direction of view for a user may correspond to a forward direction of view within the virtual reality content.

Visual content and/or virtual reality content may have been captured at one or more locations. For example, visual content and/or virtual reality content may have been captured from a stationary position (e.g., a seat in a stadium). Visual content and/or virtual reality content may have been captured from a moving position (e.g., a moving bike). For example, visual content and/or virtual reality content may include visual capture from a path taken by the capturing device(s) in the moving position. For example, visual content and/or virtual reality content may include image/video capture from a person walking around in a music festival.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

Although the processor 11 and the electronic storage 12 are shown to be connected to the interface 13 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 12. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components.

While computer program components are described herein as being implemented via processor 11 through machine readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components 102, 104, 106, 108, 110, and/or 112 may be eliminated, and some or all of its functionality may be provided by other computer program components. As another example, processor 11 may be configured to execute one or more additional computer program components that may perform some or all of the functionality attributed to one or more of computer program components 102, 104, 106, 108, 110, and/or 112 described herein.

The electronic storage media of the electronic storage 12 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 12 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 12 may be a separate component within the system 10, or the electronic storage 12 may be provided integrally with one or more other components of the system 10 (e.g., the processor 11). Although the electronic storage 12 is shown in FIG. 1 as a single entity, this is for illustrative purposes only. In some implementations, the electronic storage 12 may comprise a plurality of storage units. These storage units may be physically located within the same device, or the electronic storage 12 may represent storage functionality of a plurality of devices operating in coordination.

Figure 2:
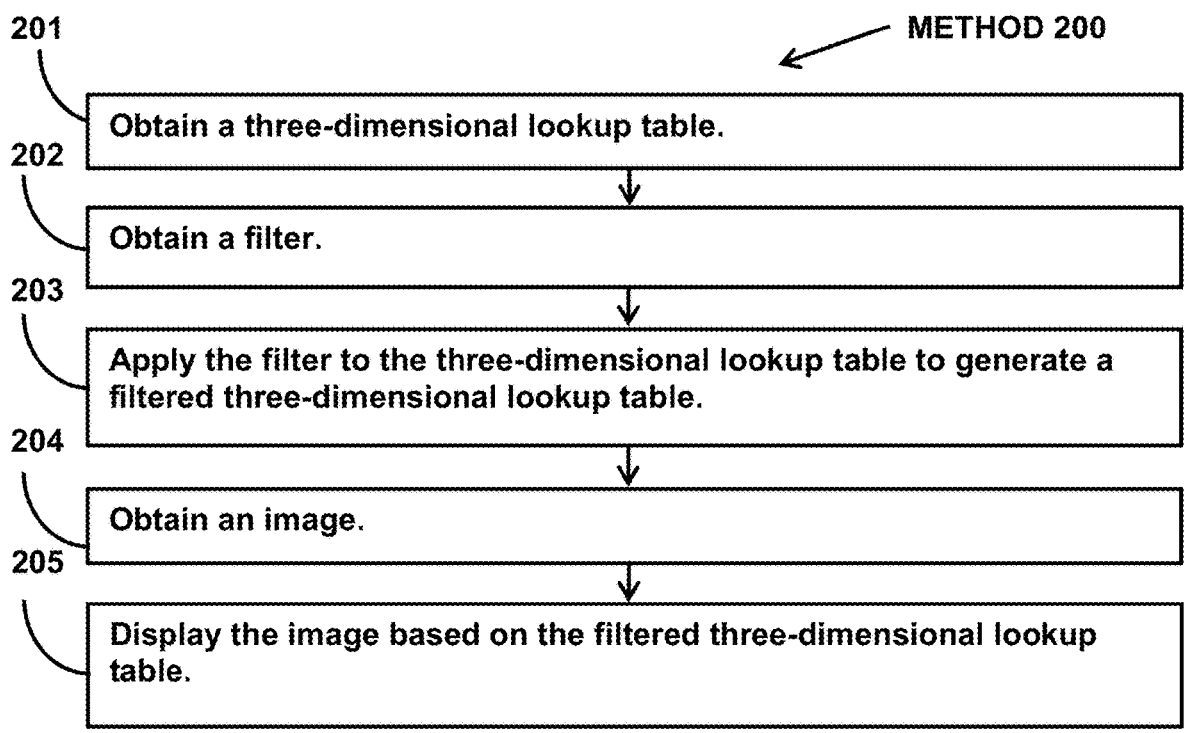
FIG. 2 illustrates an example method for transforming presentation of visual content.

FIG. 2 illustrates method 200 for transforming presentation of visual content. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operation of method 200.

Referring to FIG. 2 and method 200, at operation 201, a three-dimensional lookup table may be obtained. The three-dimensional lookup table may correspond to a display medium and may map input colors from an electronic file defining the input colors based on input pixel locations to output colors on the display medium based on output pixel locations. In some implementation, operation 201 may be performed by a processor component the same as or similar to the lookup table component 102 (Shown in FIG. 1 and described herein).

At operation 202, a filter may be obtained. The filter may characterize one or more color transformations of an unfiltered image to a filtered image such that applying the filter to the unfiltered image generates the filtered image. In some implementations, operation 202 may be performed by a processor component the same as or similar to the filter component 104 (Shown in FIG. 1 and described herein).

At operation 203, the filter may be applied to the three-dimensional lookup table to generate a filtered three-dimensional lookup table. The filtered three-dimensional lookup table may map the input colors to filtered output colors such that a display of the unfiltered image based on the filtered three-dimensional lookup table simulates a display of the filtered image. In some implementations, operation 203 may be performed by a processor component the same as or similar to the application component 106 (Shown in FIG. 1 and described herein).

At operation 204, an image may be obtained. In some implementations, operation 204 may be performed by a processor component the same as or similar to the image component 110 (Shown in FIG. 1 and described herein).

At operation 205, the image may be displayed based on the filtered three-dimensional lookup table. The display of the image based on the filtered three-dimensional lookup table may simulate a display of the image after the filter is applied to the image. In some implementations, operation 205 may be performed by a processor component the same as or similar to the display component 112 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system that transforms presentation of visual content, the system comprising:
one or more physical processors configured by machine-readable instructions to:
obtain a three-dimensional lookup table, the three-dimensional lookup table corresponding to a display medium and mapping input colors from an electronic file defining the input colors based on input pixel locations to output colors on the display medium based on output pixel locations;
obtain a filter, the filter characterizing one or more color transformations of an unfiltered image to a filtered image such that applying the filter to the unfiltered image generates the filtered image;
apply the filter to the three-dimensional lookup table to generate a filtered three-dimensional lookup table, the filtered three-dimensional lookup table mapping the input colors to filtered output colors such that a display of the unfiltered image based on the filtered three-dimensional lookup table simulates a display of the filtered image;
obtain an image;
display the image based on the filtered three-dimensional lookup table, wherein the display of the image based on the filtered three-dimensional lookup table simulates a display of the image after the filter is applied to the image; and
generate a reconstructed three-dimensional lookup table based on a comparison of an original image and a modified image, the modified image generated based on the one or more color transformations of the original image, wherein the one or more physical processors are, to generate the reconstructed three-dimensional lookup table, further configured by the machine-readable instructions to:
obtain the original image and the modified image;
sample a first set of colors of the original image at sample points within the original image;
sample a second set of colors of the modified image at the sample points within the modified image; and
determine the reconstructed three-dimensional lookup table based on comparisons of the first set of colors with the second set of colors.

2. The system of claim 1, wherein the three-dimensional lookup table is stored in a two-dimensional texture, the two-dimensional texture including color slices of the three-dimensional lookup table in an array.

3. The system of claim 1, wherein the reconstructed three-dimensional lookup table is determined further based on a tetrahedron interpolation.

4. The system of claim 1, wherein the one or more physical processors are further configured to reduce a size of the filtered three-dimensional lookup table based on one or more changes in a resolution or a number of color slices of the filtered three-dimensional lookup table.

5. The system of claim 1, wherein the image includes a video frame of a video.

6. The system of claim 1, wherein the reconstructed three-dimensional look up table compensates for one or more color differences between images captured by different image capture devices.

7. The system of claim 1, wherein the reconstructed three-dimensional look up table compensates for one or more color differences between images captured in different lighting conditions.

8. A method for transforming presentation of visual content, the method performed by a computing system including one or more physical processors, the method comprising:
obtaining, by the computing system, a three-dimensional lookup table, the three-dimensional lookup table corresponding to a display medium and mapping input colors from an electronic file defining the input colors based on input pixel locations to output colors on the display medium based on output pixel locations;
obtaining, by the computing system, a filter, the filter characterizing one or more color transformations of an unfiltered image to a filtered image such that applying the filter to the unfiltered image generates the filtered image;
applying, by the computing system, the filter to the three-dimensional lookup table to generate a filtered three-dimensional lookup table, the filtered three-dimensional lookup table mapping the input colors to filtered output colors such that a display of the unfiltered image based on the filtered three-dimensional lookup table simulates a display of the filtered image;
obtaining, by the computing system, an image;
displaying, by the computing system, the image based on the filtered three-dimensional lookup table, wherein the display of the image based on the filtered three-dimensional lookup table simulates a display of the image after the filter is applied to the image; and
generating, by the computing system, a reconstructed three-dimensional lookup table based on a comparison of an original image and a modified image, the modified image generated based on the one or more color transformations of the original image, wherein generating the reconstructed three-dimensional lookup table includes:
  obtaining the original image and the modified image;
  sampling a first set of colors of the original image at sample points within the original image;
  sampling a second set of colors of the modified image at the sample points within the modified image; and
  determining the reconstructed three-dimensional lookup table based on comparisons of the first set of colors with the second set of colors.

9. The method of claim 8, wherein the three-dimensional lookup table is stored in a two-dimensional texture, the two-dimensional texture including color slices of the three-dimensional lookup table in an array.

10. The method of claim 8, further comprising determining the reconstructed three-dimensional lookup table further based on a tetrahedron interpolation.

11. The method of claim 8, further comprising reducing a size of the filtered three-dimensional lookup table based on one or more changes in a resolution or a number of color slices of the filtered three-dimensional lookup table.

12. The method of claim 8, wherein the image includes a video frame of a video.

13. The method of claim 8, wherein the reconstructed three-dimensional look up table compensates for one or more color differences between images captured by different image capture devices.

14. The method of claim 8, wherein the reconstructed three-dimensional look up table compensates for one or more color differences between images captured in different lighting conditions.

15. A system that transforms visual content, the system comprising:
  one or more physical processors configured by machine-readable instructions to:
    obtain a three-dimensional lookup table, the three-dimensional lookup table corresponding to a display medium and mapping input colors from an electronic file defining the input colors based on input pixel locations to output colors on the display medium based on output pixel locations, wherein the three-dimensional lookup table is stored in a two-dimensional texture, the two-dimensional texture including color slices of the three-dimensional lookup table in an array;
    obtain a filter, the filter characterizing one or more color transformations of an unfiltered image to a filtered image such that applying the filter to the unfiltered image generates the filtered image;
    apply the filter to the three-dimensional lookup table to generate a filtered three-dimensional lookup table, the filtered three-dimensional lookup table mapping the input colors to filtered output colors such that a display of the unfiltered image based on the filtered three-dimensional lookup table simulates a display of the filtered image;
    reduce a size of the filtered three-dimensional lookup table based on a change in a resolution or a number of the color slices of the filtered three-dimensional lookup table;
    obtain an image; and
    display the image based on the filtered three-dimensional lookup table, wherein the display of the image based on the filtered three-dimensional lookup table simulates a display of the image after the filter is applied to the image; and
    generate a reconstructed three-dimensional lookup table based on a comparison of an original image and a modified image, the modified image generated based on the one or more color transformations of the original image, wherein the one or more physical processors are, to generate the reconstructed three-dimensional lookup table, further configured by the machine-readable instructions to:
      obtain the original image and the modified image;
      sample a first set of colors of the original image at sample points within the original image;
      sample a second set of colors of the modified image at the sample points within the modified image; and
      determine the reconstructed three-dimensional lookup table based on comparisons of the first set of colors with the second set of colors and based on a tetrahedron interpolation.

* * * * *